United States Patent
Yoo et al.

(10) Patent No.: US 7,220,327 B2
(45) Date of Patent: May 22, 2007

(54) KICK-DOWN DRUM MATERIAL AND METHOD OF MANUFACTURING THE SAME

(75) Inventors: Ji Hong Yoo, Seoul (KR); Doo Hwan Lee, Suwon-si (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 351 days.

(21) Appl. No.: 11/001,586

(22) Filed: Dec. 1, 2004

(65) Prior Publication Data

US 2005/0183800 A1  Aug. 25, 2005

(30) Foreign Application Priority Data

Feb. 23, 2004  (KR) .................... 10-2004-0011744

(51) Int. Cl.
   *C21D 1/60*  (2006.01)
   *C22C 38/44* (2006.01)

(52) U.S. Cl. .................. 148/638; 148/566; 148/567; 148/570; 148/571; 148/641; 477/34

(58) Field of Classification Search .............. 148/566, 148/567, 570–571, 586–588, 638, 641; 477/34
   See application file for complete search history.

(56) References Cited

FOREIGN PATENT DOCUMENTS

KR     2003055537      *    7/2003

* cited by examiner

*Primary Examiner*—Sikyin Ip
(74) *Attorney, Agent, or Firm*—Morgan Lewis & Bockius LLP

(57) ABSTRACT

Disclosed is a material of a kick-down drum comprising fine ferrite and microdispersion spheroidized cementite for an automobile also disclosed is a method for manufacturing the kick-down drum material. The kick-down drum of this invention can greatly improve hardenability and durability of the spline member and also has advantages of reducing production costs due to a simplified process of adding only a heating process.

2 Claims, 4 Drawing Sheets

Heating treating region

KICK-DOWN DRUM MATERIAL AND METHOD OF MANUFACTURING THE SAME

CROSS REFERENCE TO RELATED APPLICATIONS

This application is based on, and claims priority to Korean Application No. 2004-0011744, filed on Feb. 23, 2004, the disclosure of which is hereby incorporated by reference.

TECHNICAL FIELD OF THE INVENTION

This invention relates to a material for manufacturing a kick-down drum of a vehicle and a method for manufacturing the material.

BACKGROUND OF THE INVENTION

Generally, driving elements such as a clutch in automatic transmission of a vehicle are manufactured using stainless steel with excellent elongation to promote processability. More specifically, the spline member of an automatic transmission, where parts are frequently contacted, is manufactured by using stainless steel considering only its elongation. However, the friction generated by the frequent contacts made at the time of operating clutches is unable to prevent the part from being weathered and transformed. One of such parts in an automatic transmission, where parts are subjected to contact to each other, is in the kick-down drum which permits transmission shifts by restricting a reverse sun gear at the time of making second gear and fourth gear shifts (FIG. 6).

In fact, it is common that automobiles with a mileage of 70,000–80,000 miles have problems in performing transmission shifts due to the wear-out in the front end of the spline member. The main reason for the above phenomenon lies in that the material used to manufacture a kick-down drum is a heat-treated SPHD having a hardness of 190 Hv while its counter part, reverse sun gear, has a surface hardness of 650 Hv.

The following table 1 shows the composition of SPHD used as a material for manufacturing a kick-down drum. The SPHD contains a small amount of carbon and thus it does not have a desired strength or hardness.

TABLE 1

| | C | Si | Mn | P | S | Cr | Ni | Cu | Ti | Fe |
|---|---|---|---|---|---|---|---|---|---|---|
| SPHD | 0.031 | — | 0.24 | 0.010 | 0.010 | — | — | — | — | Rem. |

The SPHD in the above Table 1 comprises mostly ferrite with an extremely small amount of pearlite, wherein it has hardness of 180–190 Hv, yield strength of 244 MPa, tensile strength of 364 MPa, and elongation of 41%, thus resulting in abrasion and breakage of gear teeth in the spline member. Therefore, as an alternative to improve abrasion resistance of the spline member, it has been made with a material having excellent heat treating property via carburization/heat treatment and welded to the kick-down drum to be used. However, this requires an additional process such as finishing work of welding and heat treatment, which increases the production costs and adds complexity to the existing process. The kick-down drum consists of two parts, drum part (made of SPHD) and boss part (made of SCr420H1), and the composition of the boss part is shown below in table 2.

TABLE 2

| | C | Si | Mn | P | S | Cr | Ni | Cu | Ti | Fe |
|---|---|---|---|---|---|---|---|---|---|---|
| Present Invention | 0.34 | 0.16 | 0.77 | 0.012 | 0.001 | 0.10 | 0.013 | — | — | Rem. |

The kick-down drum has been manufactured so that the boss part (spline member) only is hardened via carburization/heat treatment and then welded to the kick-down drum to be used. However, this increases production cost due to the presence of an additional step, increasing the surface hardness (8307–836 Hv) by carburization, which then leads to increased abrasion to its counter part, cracks in the spline member when there is an excessive load due to hardening, and even in some situations causes the breakage of the spline member.

SUMMARY OF THE INVENTION

This invention provides a material for a kick-down drum of an automobile comprising fine ferrite and microdispersion spheroidized cementite having an excellent hardenability and formability.

This invention also provides a method for manufacturing the kick-down drum material using the above material thereby securing durability and cost reduction via high frequency heat treatment.

BRIEF DESCRIPTION OF THE DRAWINGS

The above and other objects and features of the present invention will become apparent from the following description of the invention, when taken in conjunction with the accompanying drawings, wherein.

DETAILED DESCRIPTION OF PREFERRED EMBODIMENTS

This invention relates to a material for a kick-down drum in an automobile comprising fine ferrite and microdispersion spheroidized cementite and a method for manufacturing the kick-down drum material. More specifically, the kick-down drum prepared according to this invention can greatly improve hardenability and durability of the spline member.

To achieve the above object, this invention provides a kick-down drum material comprising fine ferrite and microdispersion spheroidized cementite prepared by cooling a carbon steel at a rate of 150–200° C./s, wherein the carbon steel comprises Fe as a major component, about 0.32 to about 0.38 wt % of C, about 0.15 to about 0.35 wt % of Si, about 0.60 to about 0.90 wt % of Mn, about 0.03 wt % or less of P, about 0.035 wt % or less of S, about 0.02 wt % or less of Cr and other impurities.

This invention also provides a method for manufacturing the kick-down drum described above, wherein the method comprises steps of:

(a) leading-in a heating coil into the space of internal circumference of a spline member while concurrently covering a heat sealing cap on top of the spline member of the kick-down drum prepared as described above;

(b) water-cooling the kick-down drum while concurrently heating at 900–950° C. for 3–5 sec under 100 kHz and 94 kW; and (c) tempering at 140–150° C. for 1 hr in an electric furnace.

Preferably, the kick-down drum in the above method is rotated at 100–200 rpm in a predetermined rotation jig for uniform heat treatment on the spline member of the kick-down drum.

The present invention is described in greater detail as set forth hereunder.

Figure 1:
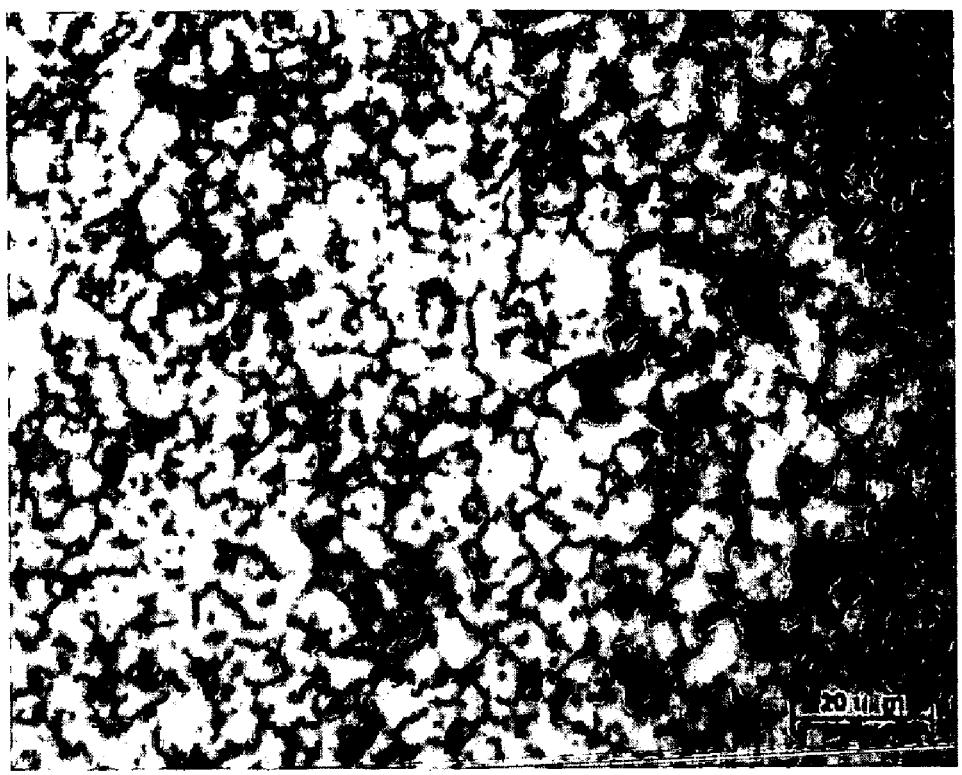
FIG. 1 shows a kick-down drum of the present invention which comprises fine ferrite and microdispersion spheroidized cementite.

The special feature of the present invention lies in applying a carbon steel material, which has an excellent hardenability and easy forming ability, comprising Fe as a major component, about 0.32 to about 0.38 wt % of C, about 0.15 to about 0.35 wt % of Si, about 0.60 to about 0.90 wt % of Mn, about 0.03 wt % or less of P, about 0.035 wt % or less of S, about 0.02 wt % or less of Cr and other impurities to a material comprising fine ferrite and microdispersion spheroidized cementite, as shown in FIG. 1, by means of cooling the carbon steel at a rate of 150–200° C./s for a kick-down drum of an automatic transmission of a vehicle.

The hardenability of the kick-down drum material of the present invention depends on the carbon content. If the carbon content is less than 0.32 wt % the resulting surface hardness is less than 650 Hv, the hardenability of its counterpart, and thus significantly increasing abrasion. In contrast, if the carbon content is greater than 0.38 wt % it results in a decrease in elongation and thus it may lower formability.

In manufacturing the kick-down drum of the present invention, if the cooling rate is less than 150° C./s it prevents both the forming of primary ferrite and layered structure thus alleviating the effect to make ferrites finer, while the cooling rate of greater than 200° C./s is not desirable from an economical and technological point of view.

The kick-down drum material of the present invention was prepared by precisely controlling the cooling rate within the range of 150–200° C./s. The kick-down drum material of the present invention comprises a rather high carbon content of 0.34 wt % but it exhibits an excellent elongation of 36%, yield strength of 244 MPa and tensile strength of 364 MPa. The spline member is integrally formed in the upper part of the kick-down drum of the present invention. The spline member is a place where abrasion and transformation occur due to frequent contacts being made between the spline member and its counter part when they are operated in a combined state thus requiring excellent anti-abrasion property. Therefore, a high frequency heat treatment is employed on the spline member, which is explained hereunder.

Figure 2:
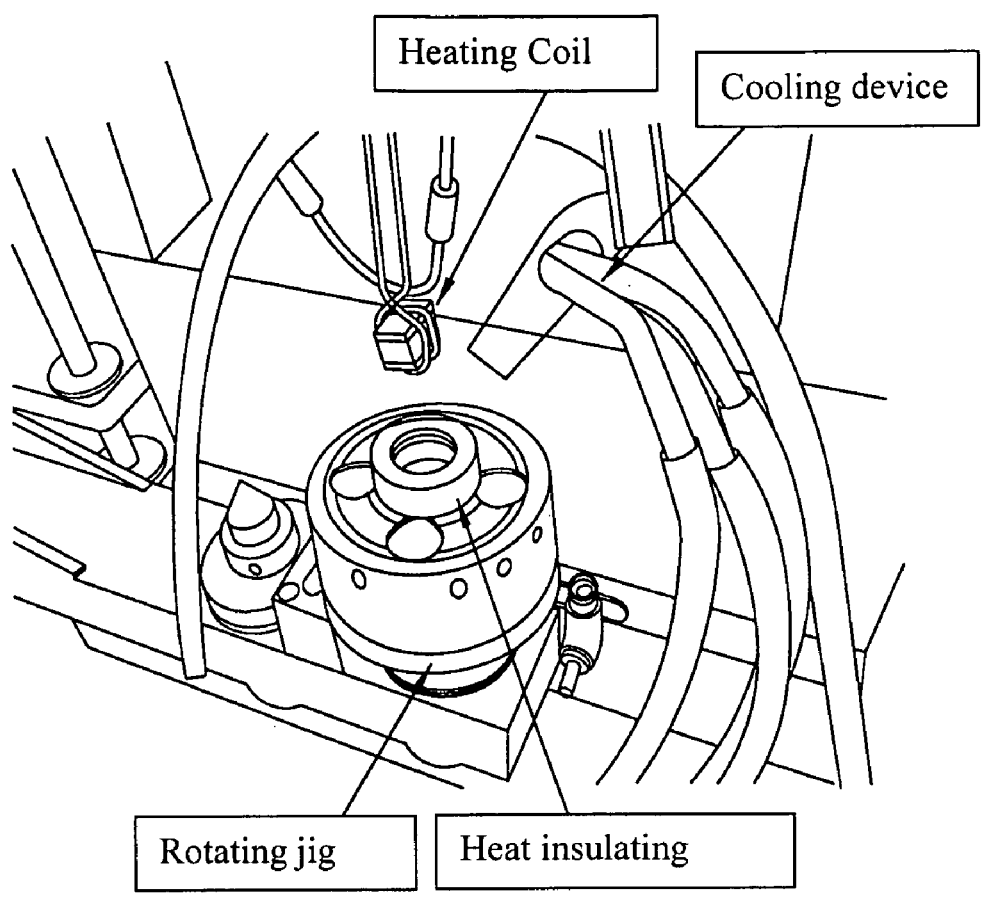
FIG. 2 shows a device for performing a heating process on the spline member of a kick-down drum of the present invention.
Figure 3:
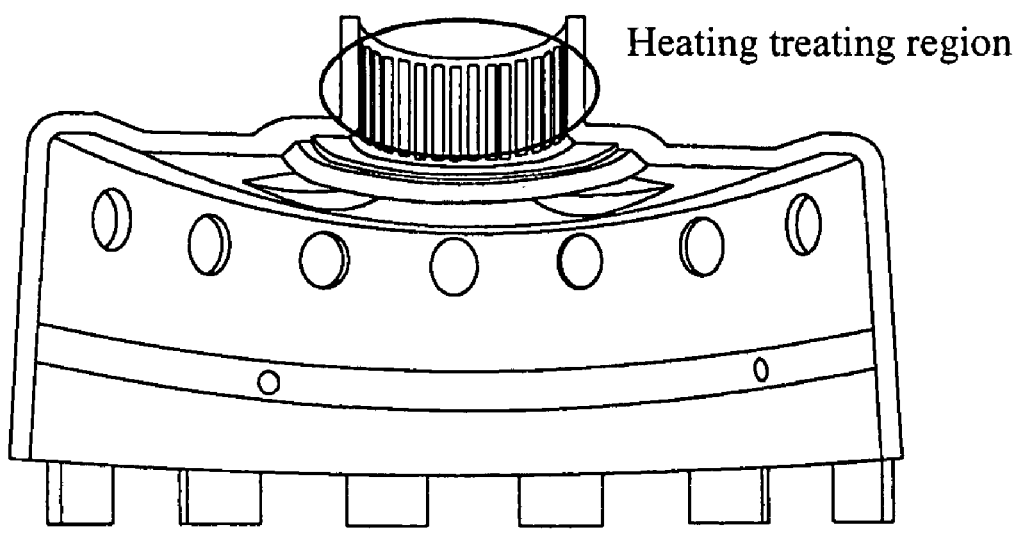
FIG. 3 shows a picture of the spline member to be heat treated.

FIG. 2 shows a device for performing a heat treatment process on the spline member of a kick-down drum of the present invention while FIG. 3 shows the spline member to be heat treated. First, the kick-down drum manufactured using the above-mentioned material is placed on the top of the rotation jig, and then covered with a cap for preventing heat transfer around the external circumference of the spline member integrally formed in the upper part of the kick-down drum while a heating coil is led into the space of the internal circumference of the spline member. Then, a water-cooling process is performed under the conditions of 100 kHz of frequency, 94 kW of voltage, heating temperature of 900–950° C. for 3–5 seconds followed by the tempering for 1 hr in the conventional electric furnace at 140–150° C. The thickness of the spline member is made about 2.9 mm considering the special feature of the part. It is impossible to perform heat treatment around the internal circumference of the spline member with a 100 kHz device and it requires a device with at least 400 kHz. In this invention, however, it is made possible to perform 100 kHz heat treatment while maximally preventing the release of heat because the external circumference of the spline member is covered with a heat-insulating cap.

When the rotation of the kick-down drum is less than 100 rpm or heat treatment is performed in a stopped state, the temperature of a specimen heated by the magnetic field of the coil is not uniform and thus it is not possible to achieve a uniform hardening, while it is not economical if the rotation exceeds 200 rpm.

When the spline member is heated at a temperature below 900° C. the heating is performed very rapidly because of the specific nature of the high frequency heat treatment and thus ostenite phase transformation of the entire structure cannot be achieved thereby unabling to obtain martensite structure. Further, if the temperature exceeds 950° C. the resulting effect is not significant and the ostenite crystal grains cannot be much grown thus not desirable.

If the heat treatment is performed for less than 3 seconds the target temperature cannot be reached over the entire target area and thus cannot obtain a uniform hardness while if the heat treatment exceeds 5 seconds it results in excessive scales thus requiring an additional process.

As stated above, the martensite structure is an unstable structure transformed by a forced rapid cooling of ostenite at high temperature and thus it is necessary to perform tempering in order to obtain a stable structure. If the tempering is performed at below 140° C. its resulting effect will not be significant while it will lead to decrease in hardness of the surface of a specimen if it is performed at above 150° C.

This invention is explained in more detail based on the following Examples however they should not be construed as limiting the scope of this invention.

EXAMPLE

The spline member of the kick-down drum manufactured by using the material of the present invention (see Table 3) comprising fine ferrite and microdispersion spheroidized cementite, with 0.34 wt % of carbon content and elongation of 36, was heat treated under the following conditions.

TABLE 3

|  | C | Si | Mn | P | S | Cr | Ni | Cu | Ti | Fe |
|---|---|---|---|---|---|---|---|---|---|---|
| Welding | 0.22 | 0.24 | 0.85 | 0.014 | 0.002 | 1.20 | 0.065 | 0.19 | 0.023 | Rem. |

| Conditions of Heat Treatment |
|---|
| Frequency: 100 kHz |
| Voltage: 94 kW |
| Temperature: 900–950° C. |
| Time: 3–5 seconds, water-cooling |
| Heating Coil Design: Horizontal and vertical coil |

Figure 4:
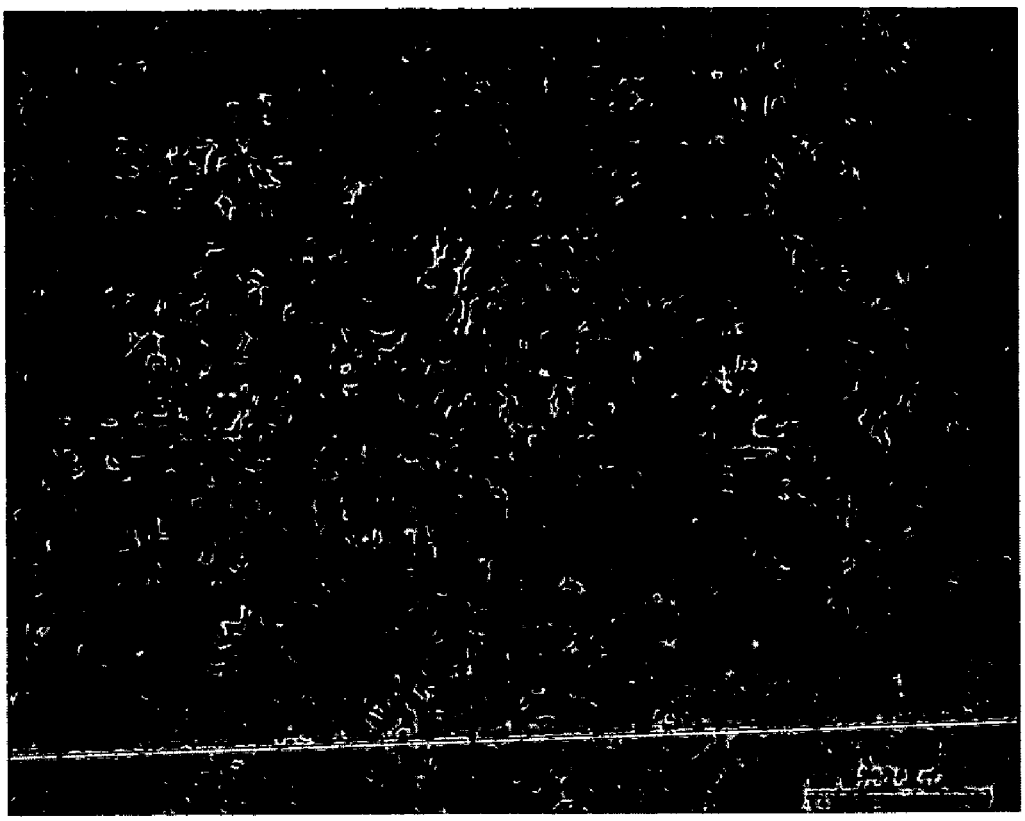
FIG. 4 shows a picture of a heat-treated structure of a material of the present invention showing a complete transformation of martensite.

Under the above heat treatment conditions, the external circumference of the spline member is covered with a heat insulating cap (made of S45C) and the spline member is rotated for uniform heat treatment after placing it on a predetermined rotation jig at 100–200 rpm. After the heat treatment, tempering is performed in an electric furnace at 140–150° C. for 1 hr. Then the hardness of the spline member was measured by using a conventional device and it was shown that the hardness of the inner outer surface of the spline member was less than 320 Hv and thus it can prevent cracks in the event that there is an excessive load on the internal surface of the spline member. Further, as a result of leading-in of high frequency, it was possible to achieve a hardness of greater than 600 Hv, and the structural analysis as shown in FIG. 4 reveals that there was martensite transformation.

Comparative Example 1

A heat treatment was performed the same as in the Example above, with the exception that heat insulating cap was not used on the spline member. Since the thickness of the spline member was only 2.9 mm the temperature of the specimen was not increased at the time of high frequency heat treatment and the heat was released to the outside thus resulting in a hardness of 244–297 Hv. Meanwhile, the lower part of the spline member is thicker than the upper part and thus its temperature increased. However, the temperatures in other regions of the spline member were not increased because they are relatively thinner thus releasing heat to the outside. Consequently, this shows that performing heat treatment without using a cap will not incur martensite transformation.

Comparative Example 2

A heat treatment was performed the same as in the Example above with the exception that the material for the heat insulating cap was not carbon steel but was a material with good heat conductivity. In general, carbon steel has heat conductivity of 0.110–0.130 cal/cm·s·c. However, if a material such as bronze (0.934 cal/cm·s·c) which has a better heat conductivity is used it results in ununiform hardening distribution. Further, if other materials, which have similar heat conductivity as carbon steel, such as nickel (0.934 cal/cm·s·c, or platinum (0.165 cal/cm·s·c), are used it would have an disadvantage of not being economical. Consequently, as aforementioned in the Example above, performing heat treatment on the spline member of the kick-down drum are advantageous in that they can secure durability of the spline member and reduce production cost.

The invention has been described in detail with reference to preferred embodiments thereof. However, it will be appreciated that those skilled in the art, upon consideration of the disclosure, may make modifications and improvements within the scope and spirit of the invention.

What is claimed is:

1. A method for manufacturing a kick-down drum comprising fine ferrite and microdispersion spheroidized cementite prepared by cooling a carbon steel at a rate of 150–200 ° C./s, said carbon steel comprising Fe as a major component, about 0.32 to about 0.38 wt % of C, about 0.15 to about 0.35 wt % of Si, about 0.60 to about 0.90 wt % of Mn, about 0.03 wt % or less of P, about 0.035 wt % or less of S, about 0.02 wt % or less of Cr and other impurities, said method comprising steps of:
   (a) leading-in a heating coil into a space of internal circumference of a spline member while concurrently covering a heat sealing cap on top of said spline member of the kick-down drum;
   (b) water-cooling said kick-down drum while concurrently heating at 900–950° C. for 3–5 sec under 100 kHz and 94 kW; and
   (c) tempering at 140–150° C. for 1 hr in an electric furnace.

2. The method for manufacturing the kick-down drum according to claim 1, wherein said kick-down drum is rotated at 100–200 rpm in a predetermined rotation jig for uniform heating of the spline member of said kick-down drum.

* * * * *